Patented Jan. 25, 1949

2,460,040

UNITED STATES PATENT OFFICE 2,460,040

PREPARATION OF AMINO ACIDS

Robert H. Sifferd, Clarendon Hills, Ill., assignor to Armour and Company, Chicago, Ill., a corporation of Illinois No Drawing. Application September 13, 1947, Serial No. 773,941

10 Claims. (Cl. 260—529)

This invention relates to the preparation of amino acids from protein. The invention is particularly useful in preparing protein hydrolysates which contain all the amino acids necessary for the development of man and animals.

In the preparation of amino acid hydrolysates now being marketed for therapeutic and dietary purposes, the methods of hydrolysis employed are confined to concentrated acid, alkali, or enzymatic digestion. The concentrated acid method is employed mainly because of the efficiency and speed with which such acids decompose the protein molecule into its elementary amino acid components. The hydrolytic acids most favored are sulfuric and hydrochloric, although various other acids are occasionally used. For example, a sulfuric acid hydrolysis of protein is carried out by boiling the protein with 20 to 50% of concentrated acid. Hydrochloric acid hydrolysis involves refluxing the protein with 3 to 5 parts of 20% acid for 10 to 20 hours. The disadvantage from such acid hydrolysis is that the hydrolysate does not contain certain important constituents and particularly tryptophane. Under the conditions of digestion employing such acids, the essential amino acid tryptophane undergoes decomposition early in the process.

Alkaline or enzymatic digestion methods are employed when it is desired to recover tryptophane in the hydrolysate. These methods are commercially undesirable, however, because of the fact that they are slow and because the alkalies have a tendency to racemize and deaminate the other amino acids thus liberated. Enzymatic digestion of proteins to amino acids is undesirable because proteolytic enzymes such as pepsin and trypsin both singly or together seldom are capable of completely degrading a protein to the amino acid stage.

As a result of the above difficulties, it has been common practice to hydrolyze proteins with concentrated sulfuric acid and then to add the particular acid which has been destroyed in processing. Usually synthetically prepared tryptophane or other amino acids are added. The main objection against such procedure, however, is that synthetic amino acids are expensive and involve an increase in the processing steps necessary to prepare a final amino acid hydrolysate.

An object of the present invention is to provide a method whereby acid digestion of proteins to produce amino acids can be effectively carried through without destroying tryptophane and other desirable amino acids. Another object is to provide a process in which protein may be hydrolyzed to produce a hydrolysate containing tryptophane while employing hydrolytic acids. Yet another object is to provide a process in which certain important amino acids, when produced in the digestion operation, are prevented from being destroyed by the presence of an organic solvent. Other specific objects and advantages will appear as the specification proceeds.

In one embodiment of my invention, the digestion of proteins containing tryptophane, etc. is carried on in an aqueous acid solution to which is added a water-immiscible aliphatic alcohol of from 4 to 6 carbon atoms. In the ensuing boiling of the mixture to bring about a digestion of the protein, the tryptophane, cystine, arginine, and other readily decomposed amino acids are held by the solvent and protected against destruction. Upon the removal of the solvent, these amino acids are recovered. Thus, in a single hydrolysis, all of the essential amino acids are recovered in the hydrolysate.

The process is applicable to all proteins where tryptophane is found, such as, blood proteins, eggs, milk, tissue proteins like brain, liver, muscle, glands, keratins, vegetable proteins such as those from corn, grasses, leaves, wheat, or cottonseed as well as proteins from such other sources as hormones, viruses, yeasts, and enzymes. The time necessary to carry out the digestion is, of course, dependent upon the original resistance of the protein to the hydrolytic action of the acid being used.

A large number of acids may be employed, such as, for example, $H_2SO_4$, $HCl$, $HNO_3$, $H_3PO_4$, acetic, formic, etc. Sulfuric acid is particularly valuable because it is easily removed from the acid residue by quantitative precipitation with barium hydroxide. The quantity of acid necessary to conduct an efficient hydrolysis will also vary with the protein being degraded, but I have found that from 5 to 15% of acid based upon the weight of protein will ordinarily hydrolyze a protein within 6 to 24 hours.

By carrying on the hydrolysis simultaneously with alcohol extraction of the amino acids as they are liberated, I find that all of the essential amino acids are recovered. Any water-immiscible aliphatic alcohol having from 4 to 6 carbon atoms may be employed. Butyl, isobutyl, amyl alcohol, and other aliphatic alcohols of from 4 to 6 carbon atoms effect an immediate solubilization of a part of the liberated amino acids in the solvent which can readily be removed from the solution. Thus, while still taking advantage of the speed and extent of hydrolysis afforded by acid digestion, important amino acids which are more readily decomposed by acid hydrolysis and which include tryptophane, threonine, methionine, etc., are recovered.

As a specific example, the following may be set out:

A blood protein is boiled with about 5% of concentrated sulfuric acid (based upon the weight of the protein) in the presence of butanol. As the amino acids are liberated, the tryptophane, etc., is extracted by the alcohol and protected against destructive action of the acid. The butanol forms a layer above the aqueous acid solution and is drawn off separately for recovery of the butanol. For example, the butanol containing the amino acids may be passed to a vacuum butanol still where the alcohol is removed from the amino acids for reuse in another digestion step.

The sulfuric acid is removed from the acid residue by quantitative precipitation with Ba(OH)$_2$.

While in the foregoing specification, I have set forth certain steps in great detail, it will be understood that such details may be varied widely by those skilled in the art without departing from the spirit of my invention.

I claim:

1. In the acid digestion of proteins to form amino acids, the step of carrying on such digestion in the presence of a water-immiscible aliphatic alcohol solvent for tryptophane of from 4 to 6 carbon atoms.

2. In a process for hydrolyzing a protein to obtain constituent amino acids thereof, the step of digesting a protein in an aqueous acid solution containing a water-immiscible aliphatic alcohol solvent for tryptophane of from 4 to 6 atoms.

3. In a process for hydrolyzing a protein to obtain constituent amino acids thereof, the steps of boiling the protein in an aqueous acid solution containing a water-immiscible aliphatic alcohol solvent for tryptophane of from 4 to 6 carbon atoms and separating the amino acids from such solution.

4. In a process for hydrolyzing a protein to obtain constituent amino acids thereof, the steps of digesting the protein in an aqueous acid solution containing a water-immiscible aliphatic alcohol solvent for tryptophane of from 4 to 6 carbon atoms, withdrawing the alcohol and amino acids contained thereby, and separating the alcohol from such amino acids.

5. In a process for hydrolyzing a tryptophane-containing protein, the steps of digesting the protein in an aqueous acid solution containing a water-immiscible aliphatic alcohol solvent for tryptophane of from 4 to 6 carbon atoms and separating the amino acids from said solution.

6. In a process for hydrolyzing a tryptophane-containing protein, the steps of digesting the protein in an aqueous acid solution containing a water-immiscible aliphatic alcohol solvent for tryptophane of from 4 to 6 carbon atoms, withdrawing the alcohol containing amino acids as a stratified layer above such aqueous acid solution, and separating the alcohol from the amino acids contained therein.

7. In a process for hydrolyzing a tryptophane-containing protein, the steps of digesting the protein in an aqueous acid solution containing a water-immiscible aliphatic alcohol solvent for tryptophane of from 4 to 6 carbon atoms, withdrawing the alcohol containing amino acids as a stratified layer above such aqueous acid solution, and separating the aqueous acid solution from the amino acids contained therein.

8. In a process for hydrolyzing a tryptophane-containing protein, the steps of digesting the protein in a dilute acid aqueous solution containing a water-immiscible aliphatic alcohol solvent for tryptophane of from 4 to 6 carbon atoms and separating the amino acids from the solution.

9. In a process for hydrolyzing a tryptophane-containing protein, the step of digesting the protein in an aqueous acid solution containing butanol.

10. In a process for hydrolyzing a tryptophane-containing protein, the steps of digesting a protein in a sulfuric acid aqueous solution containing a water-immiscible aliphatic alcohol solvent for tryptophane of from 4 to 6 carbon atoms and separating the amino acids from the sulfuric acid and solution.

ROBERT H. SIFFERD.

No references cited.

Certificate of Correction

Patent No. 2,460,040.                              January 25, 1949.

ROBERT H. SIFFERD

It is hereby certified that error appears in the printed specification of the above numbered patent requiring correction as follows:

Column 3, line 37, claim 2, before the word "atoms" insert *carbon*;

and that the said Letters Patent should be read with this correction therein that the same may conform to the record of the case in the Patent Office.

Signed and sealed this 21st day of June, A. D. 1949.

[SEAL]

THOMAS F. MURPHY,
*Assistant Commissioner of Patents.*